United States Patent
Ishizaki et al.

(10) Patent No.: US 6,657,947 B1
(45) Date of Patent: Dec. 2, 2003

(54) INFORMATION RECORDING MEDIUM AND ERROR DETECTING METHOD

(75) Inventors: Osamu Ishizaki, Makabe-gun (JP); Shigeo Fujitani, Mishima-gun (JP)

(73) Assignee: Hitachi Maxell Ltd., Ibaraki (JP)

( * ) Notice: Subject to any disclaimer, the term of this patent is extended or adjusted under 35 U.S.C. 154(b) by 0 days.

(21) Appl. No.: 09/526,443

(22) Filed: Mar. 16, 2000

(30) Foreign Application Priority Data

Mar. 17, 1999 (JP) .......................................... 11-071851

(51) Int. Cl.$^7$ ................................................ G11B 7/24
(52) U.S. Cl. ............................... 369/275.3; 369/30.12; 369/59.12
(58) Field of Search ........................... 369/13.02, 13.24, 369/13.55, 59.18, 59.1, 59.11, 59.12, 47.19, 275.3, 53.41, 275.2, 30.11, 30.12, 111, 44.13, 124.01, 59.17, 59.24

(56) References Cited

U.S. PATENT DOCUMENTS 5,726,966 A * 3/1998 Sugaya .................... 369/59.18
6,343,061 B1 * 1/2002 Kimura et al. ........... 369/275.3
6,570,839 B2 * 5/2003 Kimura et al. ........... 369/275.3

FOREIGN PATENT DOCUMENTS

JP      A-8-339540      12/1996

* cited by examiner

*Primary Examiner*—Ali Neyzari
(74) *Attorney, Agent, or Firm*—Oliff & Berridge, PLC

(57) ABSTRACT

An information recording medium has such error detecting codes that the distance between the codes of adjacent tracks of the medium is always 1. The bits $E_1$–$E_m$ of the detecting codes, which are included by pre-format information, are generated as data trains of parity check bits constructed by dividing the bits $S_1$–$S_m$ of the sector numbers and the bits $T_1$–$T_2$ of the track numbers. If the generated detecting codes are compared between adjacent, tracks, the distance between the codes is always 1. Consequently, when the detecting codes of a desired track are read out, substantially no cross talk occurs from the detecting codes of the adjacent tracks. Therefore, even if the recording medium has a narrow track pitch, it is possible to reliably and accurately detect the errors of address data of the medium.

16 Claims, 20 Drawing Sheets

Fig. 4

| TRACK NUMBERS | TRACK DATA | SECTOR DATA | ERROR DETECTING CODES |
|---|---|---|---|
| 10000 | 001101001011000 | 0000 | 1001 |
| 10001 | 001101001011001 | 0000 | 1000 |
| 10002 | 001101001011011 | 0000 | 1010 |
| 10003 | 001101001011010 | 0000 | 1011 |
| 10004 | 001101001011110 | 0000 | 1111 |
| 10005 | 001101001011111 | 0000 | 1110 |
| 10006 | 001101001011101 | 0000 | 1100 |
| 10007 | 001101001011100 | 0000 | 1101 |
| 10008 | 001101001010100 | 0000 | 0101 |
| 10009 | 001101001010101 | 0000 | 0100 |
| 10010 | 001101001010111 | 0000 | 0110 |
| 10011 | 001101001010110 | 0000 | 0111 |
| 10012 | 001101001010010 | 0000 | 0011 |
| 10013 | 001101001010011 | 0000 | 0010 |
| 10014 | 001101001010001 | 0000 | 0000 |
| 10015 | 001101001010000 | 0000 | 0001 |
| 10016 | 001101001110000 | 0000 | 0101 |
| 10017 | 001101001110001 | 0000 | 0100 |
| 10018 | 001101001110011 | 0000 | 0110 |
| 10019 | 001101001110010 | 0000 | 1110 |
| 10020 | 001101001110110 | 0000 | 1100 |

Fig. 5

| TRACK NUMBERS | TRACK DATA | SECTOR DATA | CRC CODES |
|---|---|---|---|
| 10000 | 0011010010011000 | 0000 | 1101 |
| 10001 | 0011010010011001 | 0000 | 1000 |
| 10002 | 0011010010011011 | 0000 | 0111 |
| 10003 | 0011010010011010 | 0000 | 0010 |
| 10004 | 0011010010011110 | 0000 | 1010 |
| 10005 | 0011010010011111 | 0000 | 1111 |
| 10006 | 0011010010011101 | 0000 | 0000 |
| 10007 | 0011010010011100 | 0000 | 0101 |
| 10008 | 0011010010010100 | 0000 | 0011 |
| 10009 | 0011010010010101 | 0000 | 0110 |
| 10010 | 0011010010010111 | 0000 | 1001 |
| 10011 | 0011010010010110 | 0000 | 1100 |
| 10012 | 0011010010010010 | 0000 | 0100 |
| 10013 | 0011010010010011 | 0000 | 0001 |
| 10014 | 0011010010010001 | 0000 | 1110 |
| 10015 | 0011010010010000 | 0000 | 1011 |
| 10016 | 0011010010110000 | 0000 | 1111 |
| 10017 | 0011010010110001 | 0000 | 1010 |
| 10018 | 0011010010110011 | 0000 | 0101 |
| 10019 | 0011010010110010 | 0000 | 0000 |
| 10020 | 0011010010110110 | 0000 | 1000 |

Fig. 7

$$E_m = P(S_m \quad T_1 \quad T_{2m} \quad \cdots \quad T_{n-2m+1} \quad T_n)$$
$$E_{m-1} = P(S_{m-1} \quad T_2 \quad T_{2m-1} \quad \cdots \quad T_{n-2m+2} \quad T_{n-1})$$
$$\vdots \qquad \qquad \vdots$$
$$E_3 = P(S_3 \quad T_{m-2} \quad T_{m+3} \quad \cdots \quad T_{n-(m+2)} \quad T_{n-(m-3)})$$
$$E_2 = P(S_2 \quad T_{m-1} \quad T_{m+2} \quad \cdots \quad T_{n-(m+1)} \quad T_{n-(m-2)})$$
$$E_1 = P(S_1 \quad T_m \quad T_{m+1} \quad \cdots \quad T_{n-m} \quad T_{n-(m-1)})$$

| TRACK NUMBERS | TRACK DATA | SECTOR DATA | CRC CODES/ BLANK DATA | BLANK DATA/ CRC CODES |
|---|---|---|---|---|
| 10000 | 001101001011000 | 0000 | 1101 | 1111 |
| 10001 | 001101001011001 | 0000 | 1111 | 1000 |
| 10002 | 001101001011011 | 0000 | 0111 | 1111 |
| 10003 | 001101001011010 | 0000 | 1111 | 0010 |
| 10004 | 001101001011110 | 0000 | 1010 | 1111 |
| 10005 | 001101001011111 | 0000 | 1111 | 1111 |
| 10006 | 001101001011101 | 0000 | 0000 | 1111 |
| 10007 | 001101001011100 | 0000 | 1111 | 0101 |
| 10008 | 001101001010100 | 0000 | 0011 | 1111 |
| 10009 | 001101001010101 | 0000 | 1111 | 0110 |
| 10010 | 001101001010111 | 0000 | 1001 | 1111 |
| 10011 | 001101001010110 | 0000 | 1111 | 1100 |
| 10012 | 001101001010010 | 0000 | 0100 | 1111 |
| 10013 | 001101001010011 | 0000 | 1111 | 0001 |
| 10014 | 001101001010001 | 0000 | 1110 | 1111 |
| 10015 | 001101001010000 | 0000 | 1111 | 1011 |
| 10016 | 001101001110000 | 0000 | 1111 | 1111 |
| 10017 | 001101001110001 | 0000 | 1111 | 1010 |
| 10018 | 001101001110011 | 0000 | 0101 | 1111 |
| 10019 | 001101001110010 | 0000 | 1111 | 0000 |
| 10020 | 001101001110110 | 0000 | 1000 | 1111 |

Fig. 14

| TRACK NUMBERS | TRACK DATA | SECTOR DATA | CRC CODES |
|---|---|---|---|
| 10000 | 0011010010011000 | 0000 | 1101 |
| 10001 | 0011010010011001 | 0000 | 1000 |
| 10002 | 0011010010011011 | 0000 | 0111 |
| 10003 | 0011010010011010 | 0000 | 0010 |
| 10004 | 0011010010011110 | 0000 | 1010 |
| 10005 | 0011010010011111 | 0000 | 1111 |
| 10006 | 0011010010011101 | 0000 | 0000 |
| 10007 | 0011010010011100 | 0000 | 0101 |
| 10008 | 0011010010010100 | 0000 | 0011 |
| 10009 | 0011010010010101 | 0000 | 0110 |
| 10010 | 0011010010010111 | 0000 | 1001 |
| 10011 | 0011010010010110 | 0000 | 1100 |
| 10012 | 0011010010010010 | 0000 | 0100 |
| 10013 | 0011010010010011 | 0000 | 0001 |
| 10014 | 0011010010010001 | 0000 | 1110 |
| 10015 | 0011010010010000 | 0000 | 1011 |
| 10016 | 0011010010110000 | 0000 | 1111 |
| 10017 | 0011010010110001 | 0000 | 1010 |
| 10018 | 0011010010110011 | 0000 | 0101 |
| 10019 | 0011010010110010 | 0000 | 0000 |
| 10020 | 0011010010110110 | 0000 | 1000 |

INFORMATION RECORDING MEDIUM AND ERROR DETECTING METHOD

BACKGROUND OF THE INVENTION

1. Field of the Invention

The present invention relates to information recording media which has error detecting codes, as pre-format information, for detecting erroneous address numbers. More specifically, the invention relates to information recording media in which it is possible to reduce the cross talk of the reproduced signals of error detecting codes between adjacent tracks in order to securely or reliably detect the errors of the address numbers and read the address information on the tracks.

2. Description of Related Art

The multimedia era having come, optical disks are known as information recording media which can take or cover a great quantity of data such as voice and dynamic images. An optical disk has concentric or spiral tracks which are numbered generally in radially outward (or inward) order. As shown in FIG. 3, each of the tracks is divided into sectors, in each of which information can be recorded and reproduced.

Each of the sectors has pre-format information formed as pre-pits at its front. As shown in FIG. 3, the pre-format information consists mainly of a sector mark, a VFO, an address mark, address data and a CRC (cyclic redundancy check) code. By reading the pre-pits, it is possible to obtain the address information. On the basis of the obtained address information, information is recorded in, and/or read from, the data region of the sector. The sector mark is a data pattern indicating the front of the sector. The VFO (variable frequency oscillator) is a code pattern for timing control in reading the address data positioned just at the back of it. The address mark is a code pattern indicating the starting position or point of the address data. Recorded as the address data are data representing the track number of the associated track and the sector number. The CRC code is an error detecting code for instantaneously detecting whether the address data read out just before it is correct. The CRC code is generated on the basis of the track number and the sector number.

The information recording media proposed for larger capacity in recent years include an optical recording medium having a track pitch narrowed for higher recording density in the directions across the tracks of the medium. The proposed media also include a land-groove (land and groove) type optical recording medium, of which both the lands and the grooves are used as tracks for higher recording density. The pre-pits in the sectors of an optical recording disk are adjacent to each other in the radial direction. Therefore, if the track pitch of the disk is narrowed, or if both the lands and the grooves of the disk are used as tracks, the pre-pits in each track of the disk are close to those in the adjacent tracks. Consequently, when information is read from the pre-pits in one of the tracks, signals may leak from the pre-pits in the adjacent tracks, that is to say, cross talk may occur.

In particular, because the CRC code of the pre-format information is generated on the basis of the track and sector numbers, the data trains of the CRC codes in the "n"th track from which information is being read differs entirely from those of the CRC codes in the adjacent "n+1"th and "n−1"th tracks. This makes cross talk liable to affect the CRC codes. If it is impossible under the influence of cross talk to correctly read out the CRC codes for detection of errors, it is impossible to correctly detect whether the address data read out before each CRC code is accurate. In other words, even if the address data is correctly read out, it may be judged to be erroneous. Accordingly, the cross talk from the adjacent tracks is a very serious problem in address data error detection.

In the land-groove type optical recording medium, sector marks and/or ID data which include address information are recorded in both the lands and grooves. For example, when information is read from one of the lands (or grooves), cross talk occurs from the adjacent grooves or groove (or lands or land), making it difficult to correctly read the address information from the lands.

In view of the above problems, Japanese Patent Application Laid-Open No. 8-339540 discloses an optical recording medium for recording in lands and grooves. This recording medium has sectors each including a sector ID region. This ID region consists of a sector mark indicating the front of the sector, an ID data zone and a space without a pit. The space of each of the sector ID regions formed in a groove is positioned adjacent to the ID data zone of one of the sector ID regions formed in a land. Likewise, the space of each of the sector ID regions in a land adjoins the ID data zone of one of the sector ID regions in a groove. Specifically, each sector ID region in each groove consists of a sector mark, a space and an ID data zone in that order, while each sector ID region in each land consists of a sector mark, an ID data zone and a space in that order. Each of the ID data zones is a data train consisting of a VFO, an address mark, address data and a CRC code.

The space of each sector ID region is equivalent in area to the ID data zone, which consists of a VFO, an address mark, address data and a CRC code, of each sector ID region. The area of the spaces of the sector ID regions restricts the recording capacity of the optical recording medium. The capacity restriction does not match the need for recording densification or higher recording density.

SUMMARY OF THE INVENTION

The present invention has been made for solution of the problems with, and the disadvantages of, the prior art. A first object of the invention is to provide an information recording medium having novel error detecting codes as pre-format information which can be less affected by cross talk from the adjacent tracks.

A second object of the invention is to provide an information recording medium which can be less affected by cross talk from the adjacent tracks, and which can realize larger capacity.

A third object of the invention is to provide a novel error detecting method which can detect the error of address information reliably with little influence of cross talk from the adjacent tracks.

According to a first aspect of the invention, there is provided an information recording medium having a plurality of tracks each sectioned into sectors, the medium being characterized in:

that each of the sectors has a mark representing address data which represents the address of the associated sector and a mark representing an error detecting code for detection of the error of the address data; and that the error detecting codes of the tracks are so formed that the distance between the detecting codes of any adjacent tracks is always 1.

The error detecting codes for detection of the errors of the address data of this information recording medium are so formed that the distance between the codes of adjacent tracks is always 1. In other words, the detecting codes are constructed in such a manner that, when the codes of adjacent tracks are compared, there is only one reverse bit. Consequently, when the detecting code of one of adjacent tracks is read out, there is only one place where signal leakage (cross talk) may occur from the other track. This minimizes the influence of cross talk. Therefore, even if the recording medium has a narrow track pitch, it is possible to reliably read out the detecting codes, making it possible to reliably detect the errors of the address data.

In this specification, the term "mark/s" is/are the concept of any marks formed by changes in physical or chemical shape, material or structure. The marks may be pits formed in any shape in a substrate, magnetic marks formed in accordance with the directions of magnetization on a magnetic film, marks formed on the basis of a change of phase between the crystalline and amorphous substances on a phase change film, or marks formed on the basis of a change of shape or material with heat, light and/or the like on an organic pigment film.

In this invention, generation of such error detecting codes that the distance between the codes of adjacent tracks is always 1 may involve generating check bits for parity checks on the basis of the sector numbers and the Gray coded track numbers, and forming or constructing the detecting codes out of the check bits. A method of generation as an example will be described below in detail, but the invention is not limited to it.

First, the bits of the track number of a track are expressed as $T_1, T_2, \ldots, T_{n-1}$, and $T_n$, and the bits of the data train representing the sector number of a sector of this track are expressed as $S_1, S_2, \ldots, S_{m-1}$ and $S_m$ (m<n). It is assumed that the track number represented as bits of data has been Gray coded by a method described later. If the bits of the error detecting code for this sector are expressed as $E_1$, $E_2, \ldots, E_{m-1}$ and $E_m$ in ascending order, the bits are expressed as shown in FIG. 7. For simplification, the number of bits of the detecting code is equal to that of the sector number. The number of bits of the code might, however, be arbitrary. In FIG. 7, P represents a check bit for a parity check. An even parity check involves adding a check bit "1" or "0" to the data train in such a manner that the total number of 1's in a data train is always an even number. An odd parity check involves adding a check bit "1" or "0" to the data train in such a manner that the total number of 1's in a data train is always odd. When the thus obtained trains of error detecting codes of adjacent tracks are compared, the distance between the codes is 1. In order to detect the error of address data consisting of a track number and a sector number, it is possible to judge or decide whether the total number of 1's in the data train consisting of the address data and the associated error detecting code is even or odd. Specifically, for an even parity check, when the data train consisting of address data and the associated error detecting code is read out, it is found that there is no error in the address data if the total number of 1's in this data train is even, while there is an error in the address data if the total number is odd.

The Gray coding of a track number will be described below. Gray coding is such conversion of serial data trains that one bit differs between the "n−1"th and "n"th trains and between the "n"th and "n+1"th trains, that is to say, the distance between the codes is 1, and that the "n−1"th and "n+1"th converted trains differ from each other. A track number may be converted into a Gray code as follows.

If a track number is expressed as an n-bit binary number, the bits of which are expressed as $t_n, t_{n-1}, t_{n-2}, \ldots, t_2$ and $t_1$, then the bits $g_n, g_{n-1}, g_{n-2}, \ldots, g_2$ and $g_1$, of the Gray coded number are expressed by the following expressions:

$$g_m = t_{m+1} \wedge t_m$$

(where m=1, 2, ..., n−1, and ^ represents exclusive OR) $g_n = t_n$.

That is to say, the exclusive OR operation of the first bit $t_1$, and the second bit $t_2$ of the n bits is performed, and the resultant value is made the first bit $g_1$ of the Gray coded number. Next, the exclusive OR operation of the second bit $t_2$ and the third bit $t_3$ of the n bits is performed, and the resultant value is made the second bit $g_2$ of the Gray coded number. Likewise, the exclusive OR operation of the "n−1"th bit $t_{n-1}$ and the "n"th bit $t_n$ of the n bits is performed, and the resultant value is made the "n−1"th bit $g_{n-1}$ of the Gray coded number. One bit equal to the highest bit $t_n$ of the number before Gray coding is added to the highest bit $g_n$ of the Gray coded number. In this way, all track numbers are converted in order into Gray codes. The distance between the codes of adjacent tracks is 1. One bit differs between the Gray coded track numbers of adjacent tracks. This makes it possible to reduce the influence of cross talk on not only the error detecting codes but also the track numbers, enabling the track numbers to be read out reliably.

According to a second aspect of the invention, there is provided an information recording medium having a plurality of tracks each sectioned into sectors, the medium being characterized in:

that each of the sectors has marks representing pre-format signals;

that the pre-format signals include a sector mark representing the front of the associated sector, a VFO for timing control in reading data, an address mark representing the position from which address data starts to be read out, address data representing the address of the sector, and a CRC code for detection of the error of the address data; and that one of any adjacent tracks has blank data just before each of the CRC codes thereof, while the other track has blank data just behind each of the CRC codes thereof, so that the CRC codes of the adjacent tracks do not adjoin.

As shown in FIG. 12, this information recording medium is provided with blank data just-behind the CRC code of the track 0 (or 1) and blank data just before the CRC code of the track 1 (or 2) adjacent to the track 0 so that the zones of the codes of each track are offset from those of the other track. This makes it possible to reduce the occurrence of cross talk from the pre-pits in adjacent tracks without substantially reducing the recording capacity of the recording medium. This recording medium requires blank data only before and behind the CRC codes, in contrast to the format disclosed in Japanese Patent Application Laid-Open No. 8-339540, for the following reason.

As stated in the Related Art section, the CRC codes of the pre-pits formed in advance in an information recording medium are generated on the basis of the track numbers and the sector numbers. Consequently, the CRC codes of each track are data trains different entirely from those of the adjacent tracks, and are subject to the influence of cross talk. In contrast, the other data of the pre-pits, which may include sector marks, VFOs and address marks, are the same data trains for all the sectors, and are therefore little or less subject to the influence of cross talk. The sector numbers of the address data of the pre-pits are the same for the sectors adjacent in the directions across the tracks (the sectors at the circumferentially same position of a recording medium in disk form). Therefore, the sector numbers are little or less subject to the influence of cross talk likewise. The inventors have directed their attention to this point, and provided blank data having the same length as each of the CRC codes before or behind each of these codes, which are subject to the influence of cross talk, in order for the blank data to offset the CRC codes so that the codes of each track do not adjoin those of the adjacent tracks. In the tracks of odd (or even) track numbers, blank data may be positioned just behind each of the CRC codes. In the tracks of even (or odd) track numbers, blank data may be positioned just before each of the CRC codes. This interposes each CRC code of each track between the blank data (of the adjacent sectors) of the adjacent tracks. Consequently, when the CRC codes of each track are read out, no signal leakage (cross talk) occurs from the CRC codes of the adjacent tracks. It is therefore possible to reliably read out the CRC codes, making it possible to reliably detect the errors of the address data. Because the blank data are equal in length to the CRC codes, the recording capacity is not reduced substantially.

In this invention, the blank data may be zones each formed with no mark or a continuous mark. In this case, even if signals leak from pre-pits in adjacent tracks, the values of the leaking signals do not change, but are always constant. Therefore, the signal leakage does not affect the reading of reproduced signals from the CRC codes of a desired track.

It is preferable that the track numbers in the information recording medium according to the second aspect of the invention be converted into Gray codes. The track numbers can be converted into Gray codes by the foregoing Gray coding method. The conversion results in (or leads to) one place in the track number of each track where the bit differs from that of the track number of an adjacent track, that is to say, two places in the track number of each track where each of the bits differs from that of the track number of one of the adjacent tracks. This reduces the number of places where cross talk may occur. It is therefore possible to reliably read out the track numbers.

According to a third aspect of the invention, there is provided an error detecting method for detecting the error of address information including a track number which represents the position of a track and a sector number which represents the position of a sector, the method being comprising the steps of:

converting the track number into a Gray code;

dividing the Gray coded track number and the sector number to obtain a plurality of data groups;

generating such parity check bits each from one of the data groups that the distance between the codes of adjacent tracks is 1; and detecting the error of the address information by using the check bits.

This error detecting method may include expressing the Gray coded track number as a train of 16 bits $T_1T_2, \ldots, T_{15}T_{16}$ and the sector number as a train of 4 bits $S_1S_2S_3S_4$, and dividing the bits of these trains into data groups $A_1$–$A_4$ as shown in FIG. 8. The data groups might be replaced by data groups $B_1$–$B_4$, data groups $C_1$–$C_4$ or data groups $D_1$–$D_4$ as shown in FIG. 9. Check bits for even or odd parity checks are made up from the data groups $A_1$–$A_4$. Error detecting codes are generated from the check bits. The distance between the error detecting codes of adjacent tracks is always 1. Accordingly, when the error detecting code of a desired track is read out, the influence of cross talk from the adjacent tracks is reduced.

To this error detecting method as well, the foregoing Gray coding method can be applied as a method for converting a track number into a Gray code.

BRIEF DESCRIPTION OF THE DRAWINGS

FIG. 4 is an example of the pre-pit data formed in the tracks Nos. 10000–10020 of the magneto-optical disk made in Embodiment 1.

FIG. 5 is an example of the pre-pit data formed in the tracks Nos. 10000–10020 in a case where CRC codes are used for error detection.

FIG. 7 is expressions for description of the construction of the bits of an error detecting code according to the invention.

FIG. 8 shows data groups for generation of an error detecting code, which are obtained with bits selected from track data and sector data.

FIG. 9 shows data groups for generation of error detecting codes, which are other than those shown in FIG. 8, and which are obtained with bits selected from track data and sector data.

FIG. 13 is an example of the pre-pit data for track Nos. 10000–10020 of the magneto-optical disk made in Embodiment 2.

FIG. 14 is an example of the pre-pit data without blank data for track Nos. 10000–10020.

DESCRIPTION OF PREFERRED EMBODIMENTS

Embodiments of the present invention will be described below in detail with reference to the drawings, but it is not limited to them.

Embodiment 1

Figure 2:
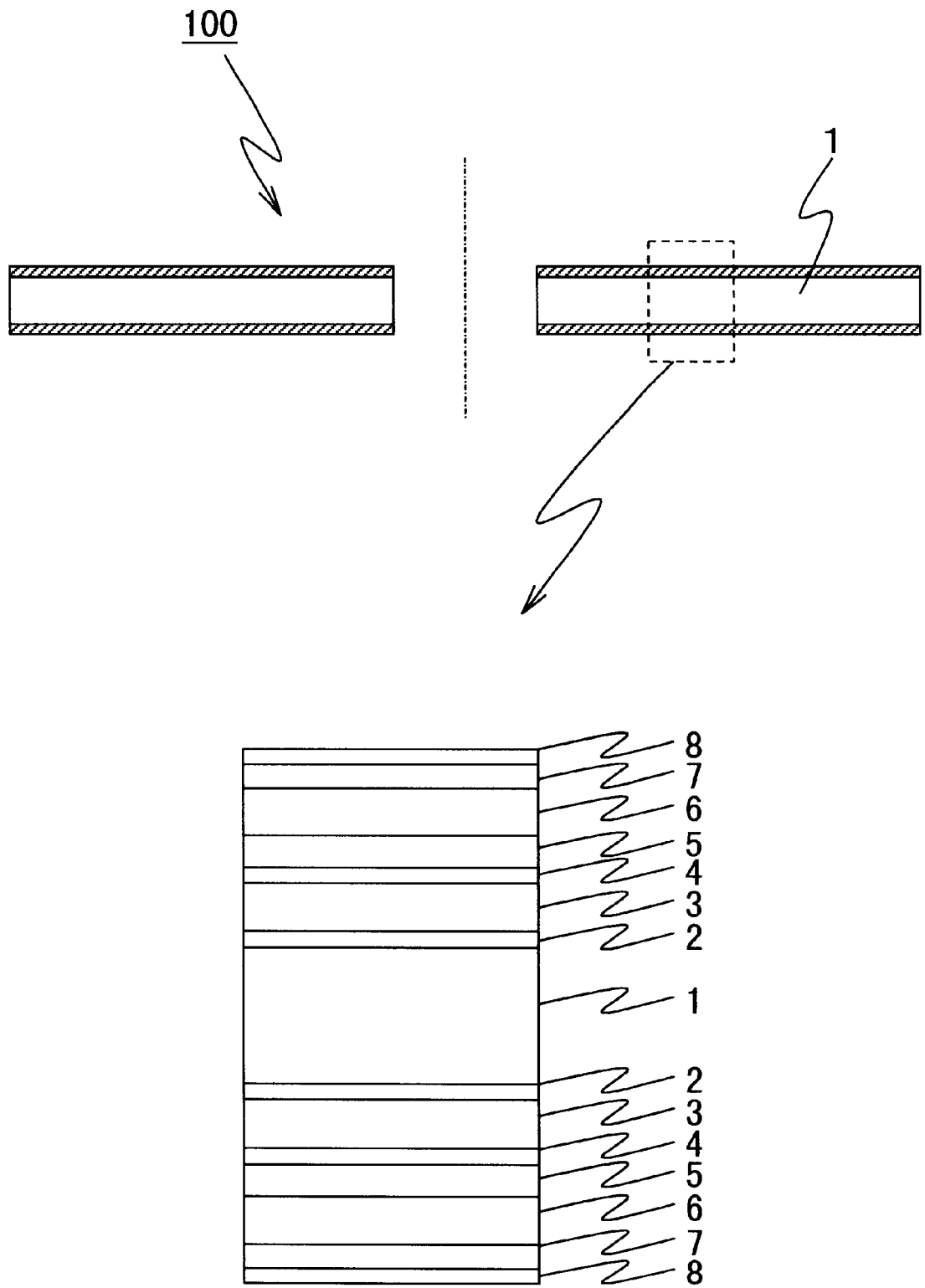
FIG. 2 is a mimetic section of a magneto-optical disk according to the invention, which was made in Embodiment 1.
Figure 3:
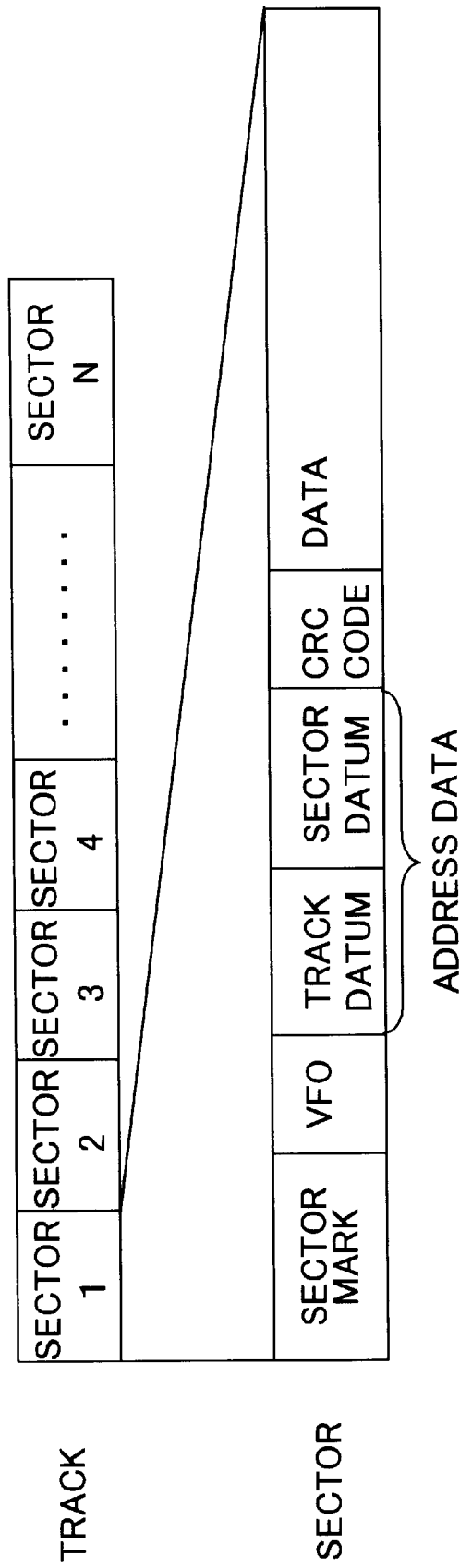
FIG. 3 is a view for description of the formation of a track and sectors.

A double-sided recording type magneto-optical disk 100 as shown in an upper portion of FIG. 2 was made. As shown in a lower portion of FIG. 2, the disk 100 includes a buffer layer 2, an AlTi reflective layer 3, an SiN dielectric layer 4, a magneto-optical layer 5, an SiN dielectric layer 6, a hydrogen containing carbon protective layer 7 and a lubricant layer 8 which are laminated or stacked in order on each side of a substrate 1. The substrate 1 was made by a process which includes mounting, on or in an injection (molding) mold, a stamper embossed with patterns which correspond to pre-pit data, and injecting and filling molten polycarbonate resin into the mold. The substrate 1 has a spiral guide groove formed on each side for use as tracks. The guide groove has a track pitch of 0.5 micron, a width of 200 nm and a depth of 80 nm.

Figure 1:
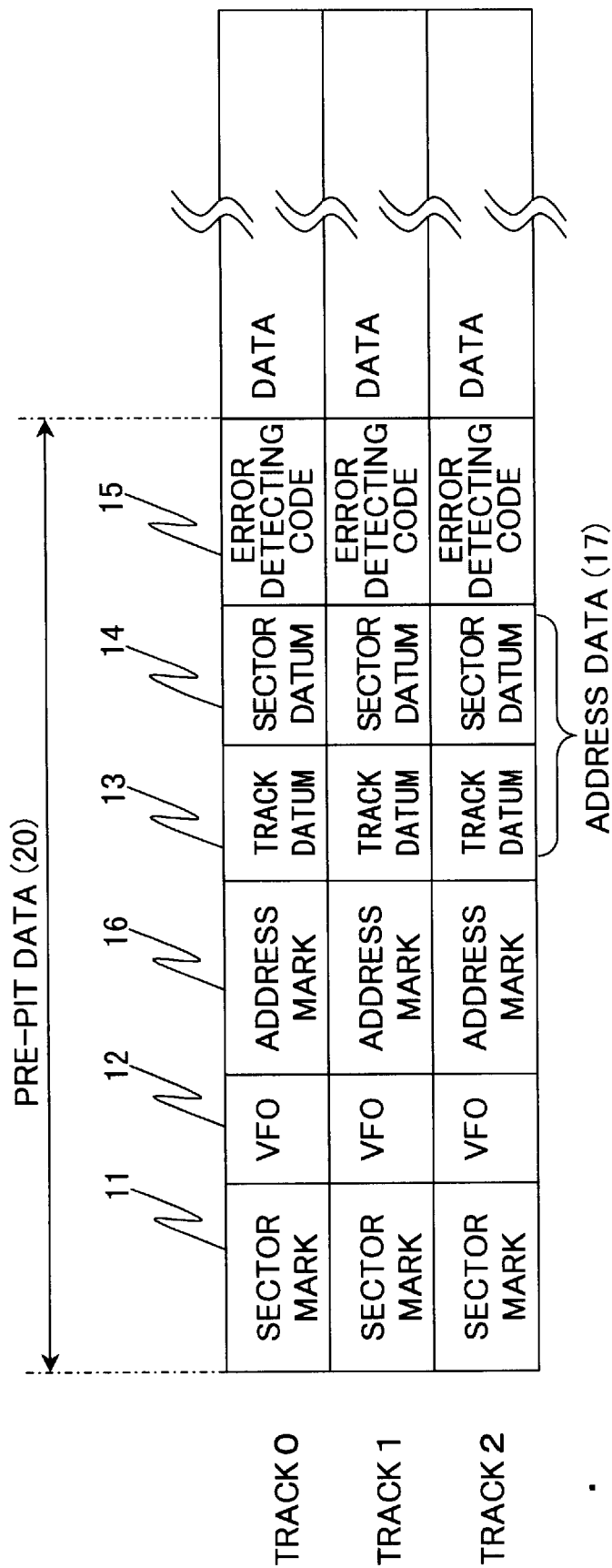
FIG. 1 is a mimetic view of the formation of pre-pits in an information recording medium according to the first aspect of the present invention.

Each of the tracks is divided into sectors. As shown in FIG. 1, each of the sectors has pre-pit data 20 formed in its front, which consists of a sector mark 11, a VFO 12, an address mark 16, address data 17 and an error detecting code 15. The address data 17 includes a track datum 13 converted into a Gray code and a sector datum 14 representing the position of the sector. The track datum 13 is a data train of 16 bits. The sector datum 14 is a data train of 4 bits. The detecting code 15 was generated as follows. The bits of the track datum 13 are represented by $T_1, T_2, \ldots, T_{n-1}, T_n$. The bits of the sector datum 14 are represented by $S_1, S_2, S_3$ and $S_4$. From these track and sector data bits, the bits $E_1, E_2, E_3$ and $E_4$ of the detecting code were generated as $$E_4 = P(S_4 T_1 T_8 T_9 T_{16})$$

$$E_3 = P(S_3 T_2 T_7 T_{10} T_{15})$$

$$E_2 = P(S_2 T_3 T_6 T_{11} T_{14})$$

$$E_1 = P(S_1 T_4 T_5 T_{12} T_{13})$$

where P represents a check bit for even parity check, and where the check bit of 1 or 0 is added to each of the parenthesized data trains in such a manner that the total number of 1's in each of the parenthesized data trains was always an even number. FIG. 4 exemplifies the data trains of track data, sector data and error detecting codes recorded as part of the pre-pit data in the tracks Nos. 10000–10020 (decimal numbers). As evident from FIG. 4, the distance between the detecting codes in adjacent tracks is 1.

Next, a spattering apparatus or device (not shown) was used to form, in order on each side of the substrate 1, where the pre-pit data 20 had been formed, a buffer layer 2 of SiN dielectric having a thickness of 20 nm, a reflecting layer 3 of AlTi having a thickness of 80 nm, an SiN dielectric layer 4 having a thickness of 2 nm, a magneto-optical layer 5 of TbFeCo having a thickness of 20 nm, an SiN dielectric layer 6 having a thickness of 80 nm, and a hydrogen containing carbon protective layer 7 having a thickness of 10 nm. Then, a spin coater was used to coat the protective layer 7 with a lubricant layer 8 of Fomblin Z-DOL (trade name) having a thickness of 2 nm. Thus, a magneto-optical disk 100 of the structure shown in FIG. 2 was made.

Figure 10:
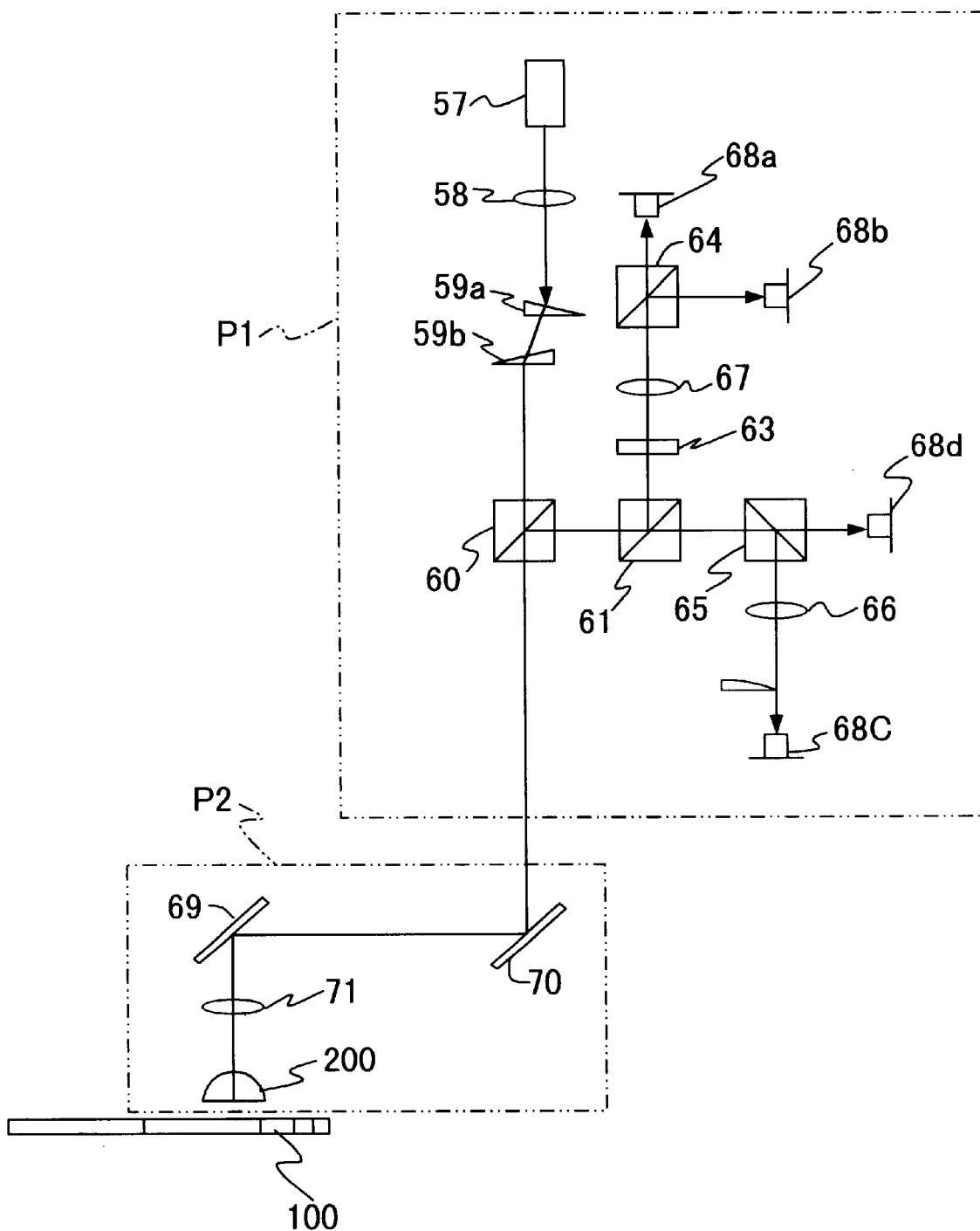
FIG. 10 is a mimetic diagram of the optical system of a recorder/reproducer including a floating or suspended type head fitted with a solid immersion lens.

Next, a recorder/reproducer or recording/reproducing apparatus including a fixed optical system P1 and a movable optical system P2 as shown in FIG. 10 is used to record information on, and/or reproduce information from, the magneto-optical disk 100. The movable optical system P2 includes a floating or suspended type head fitted with a solid immersion lens 200. Recorder/reproducer including a floating type head fitted with such a solid immersion lens is known, and reference may be made to Japanese Patent Application Laid-Open No. 8-266369. With reference to FIG. 10, a laser illuminant 57 emits a laser beam, which passes through a lens 58, prisms 59a and 59b, and a beam splitter 60. Then, after the laser beam is reflected by mirrors 70 and 69, it is incident on an objective lens 71, condensed by a solid immersion lens 200 and focused at the bottom of this lens. A light beam effuses from the bottom of the immersion lens 200 and reaches the recording layer of the magneto-optical disk 100, where it forms a magnetic mark according to a recording signal. During recordation, a recording magnetic field is applied to the magneto-optical disk 100. Information can be recorded by any of an optical or light modulation method, a magnetic field modulation method and a magneto-optical modulation method.

During reproduction, the light beam reflected by the magneto-optical disk 100 is reflected by the mirrors 69 and 70 and the beam splitter 60, and split by a beam splitter 61 into two light beams toward beam splitters 64 and 65. The reflected beam incident on the beam splitter 65 is further split there into two light beams, which are incident on a focusing detector 68c and a tracking signal detector 68d. The reflected beam having passed through a half-wave plate 63 and a lens 67 and incident on the beam splitter 64 is further split there into two light beams, which are incident on photodetectors 68a and 68b for detecting polarized light beam components crossing each other. The photodetectors 68a and 68b detect reproduced signals. After pre-pit signals from pre-pits formed in the magneto-optical disk are detected by the photodetectors 68a and 68b, the signals are output to the adder 81 of the detecting circuit 110 shown in FIG. 11. The detecting circuit 110 consists mainly of an adder 81 for adding signals from the photodetectors 68a and 68b, a subtracter 82 for subtracting signals from the photodetectors 68a and 68b, an AGC (automatic gain control) amplifier 83 for stabilizing the output from the adder 81, a binary coded signal processor 84 for digital conversion of the output from the amplifier 83, and a decoder 85 for restoring binary coded signals from the processor 84 into pre-pit data trains synchronously with a clock. After the AGC amplifier 83 stabilizes the amplitude of signals output from the photodetectors 68a and 68b and input to the adder 81, the signal processor 84 restores the signals into digital signals. A sector mark detector 86 detects sector patterns from the data trains of the digital signals. A clock generator 87 generates reproducing clocks from the digital signals obtained from VFO patterns out of the pre-pit signals. Track numbers, sector numbers and error detecting codes are restored from the reproducing clocks and the digital signals of the track numbers, sector numbers and error detecting codes.

Figure 6:
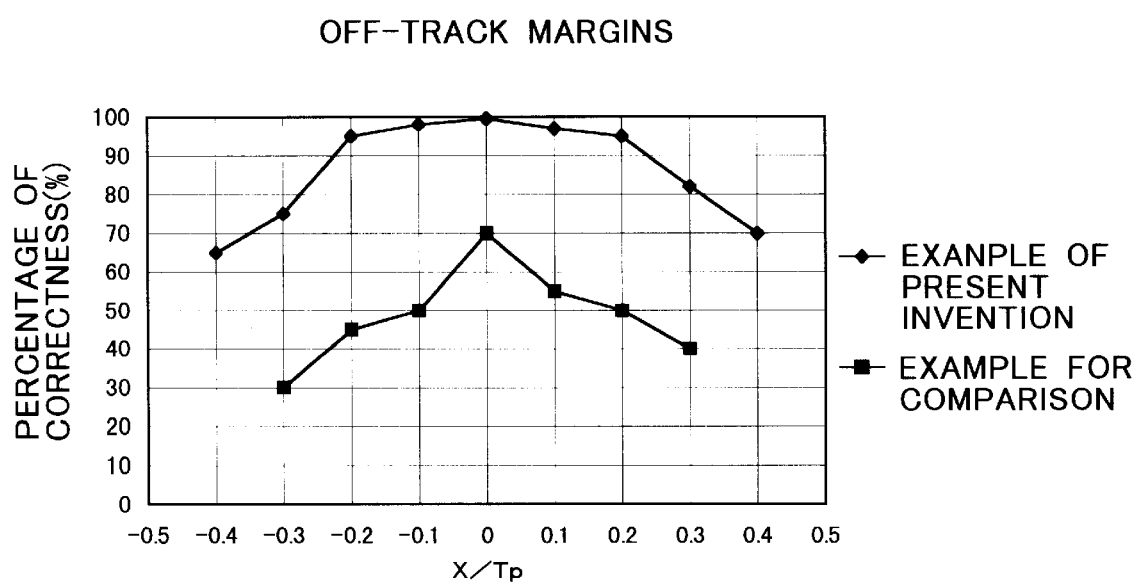
FIG. 6 is a graph showing the percentages of correct decoding with respect to the displacement from the central middle positions in the tracks of the magneto-optical disk made in Embodiment 1.
Figure 11:
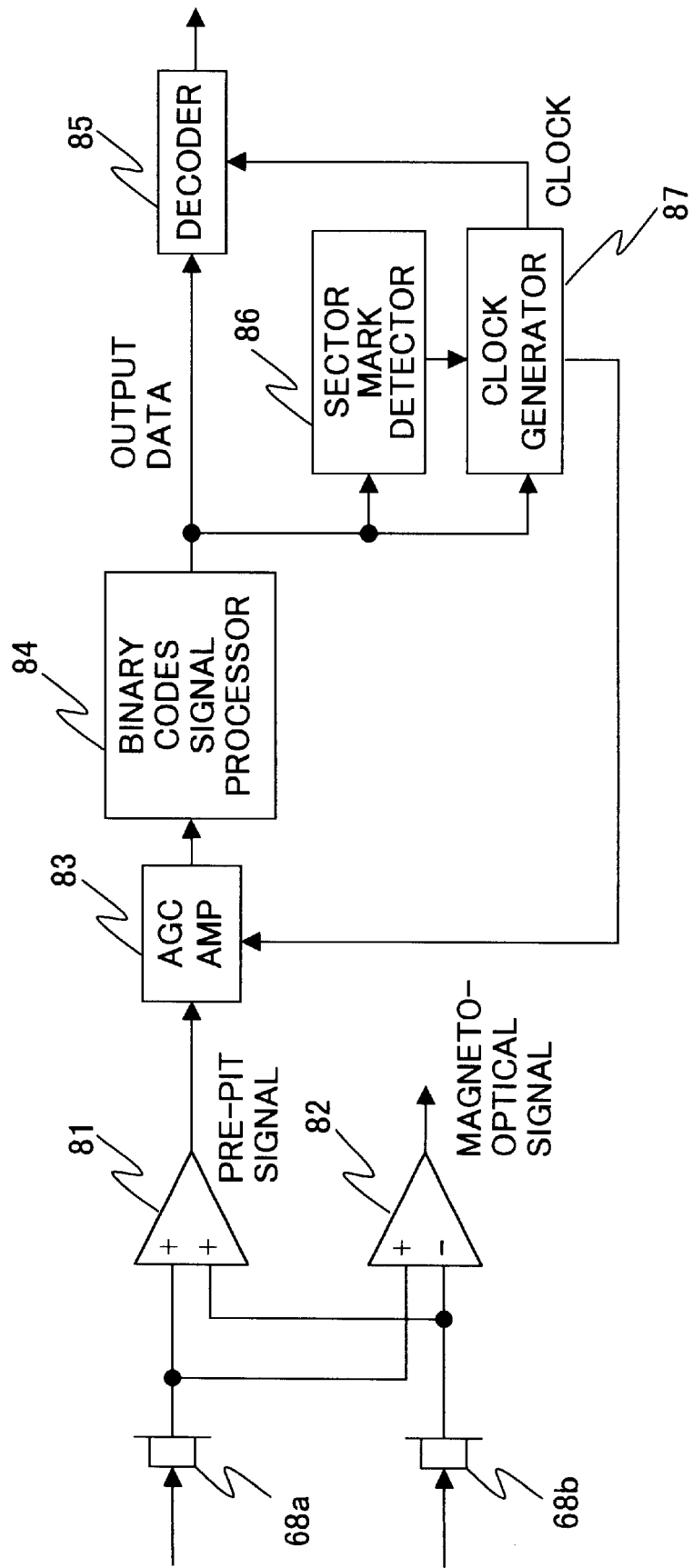
FIG. 11 is a mimetic diagram of the circuit for detecting a pre-pit signal of the recorder/reproducer shown in FIG. 10.

With the magneto-optical disk 100 set in the recorder/reproducer shown in FIGS. 10 and 11, signals reproduced from pre-pits of the disk were detected, and it was found out whether address data and sector data had been decoded correctly or exactly (percentages of correct decoding). The results are shown in the graph of FIG. 6. The percentages of correct decoding were found out with the associated error detecting codes of the invention. For comparison, the graph of FIG. 6 shows percentages of correct decoding on a magneto-optical disk having CRC codes (FIG. 5), which are error detecting codes of a conventional type. In the graph of FIG. 6, the horizontal axis (X/Tp) represents the ratios of the displacement (X) from the central (middle) positions in tracks of the disk in the directions across the tracks to the track pitch (Tp).

As obvious from the graph of FIG. 6, the percentages of correct decoding on the magneto-optical disk of the invention are improved. This proves the address information and the error detecting codes to have been correctly read out. It is also found out that high percentages of correct coding are obtained even if the information and the codes are read out at positions displaced from the central positions in the tracks in the directions across the tracks, and that the track offset margins are wider.

Embodiment 2

Figure 12:
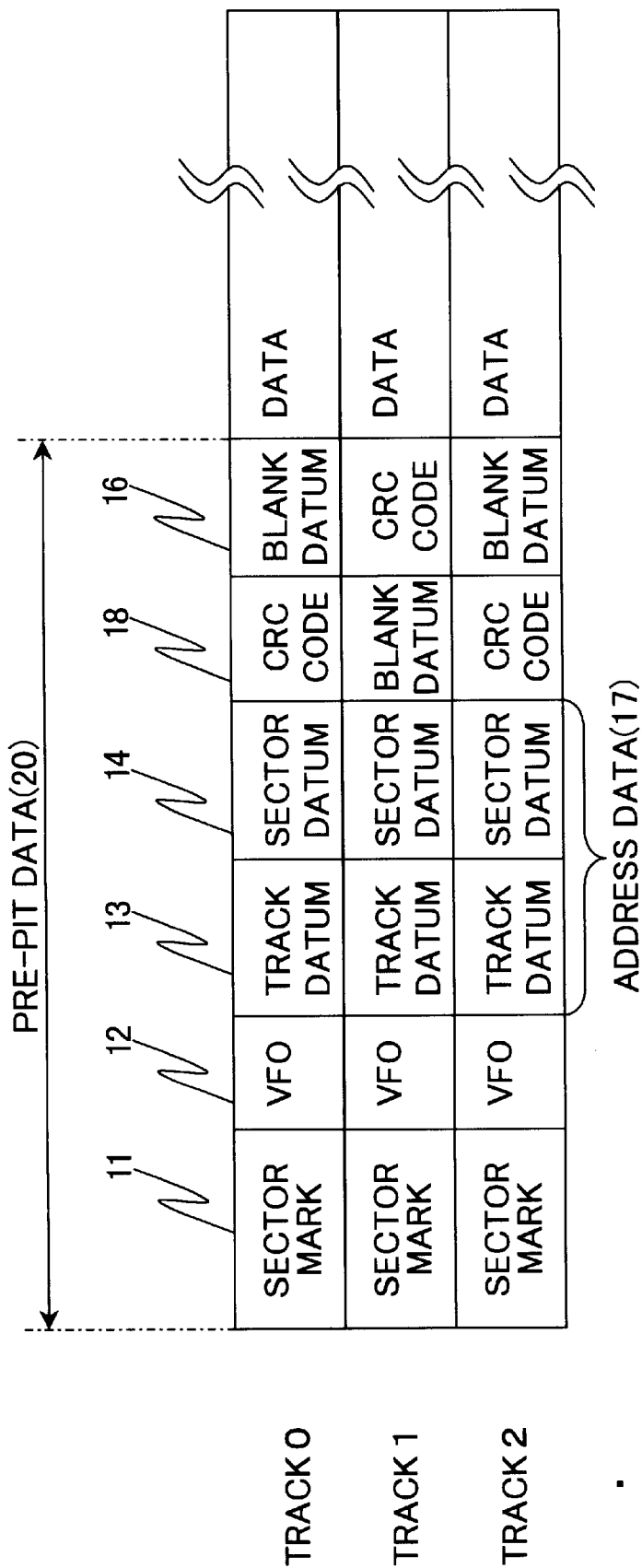
FIG. 12 is a mimetic view of the formation of pre-pits in an information recording medium according to the second aspect of the invention.

A double-sided recording type magneto-optical disk was made in a way similar to the way in which the magneto-optical disk 100 was made in the embodiment 1, except that the disk according to this embodiment 2 includes a substrate having pre-pit data 20 formed at the front of each sector of each track, as shown in FIG. 12. The pre-pit data consists of a sector mark 11, a VFO 12, address data 17, a CRC code 18 and a blank datum 16. The address data 17 includes a track datum 13 converted into a Gray code and a sector datum 14 representing the position of the sector. FIG. 13 shows the data trains of track data, sector data, CRC codes and blank data recorded as part of the pre-pit data 20 in the tracks Nos. 10000–10020 (decimal numbers). The track data were recorded in data trains of 16 bits. The sector data were recorded in data trains of 4 bits. Each CRC code is found by a method including the steps of expressing the data which consists of the associated track datum and sector datum as a predetermined or specified polynomial (expression) D(X), and dividing this polynomial by a generating function G(X)=$X^4$+X+1. The remainder R of the division is the CRC code. Error detection involves dividing the data which includes the remainder R (CRC code) and the polynomial D(X) again by the generating function G(X). If the remainder of this division is 0, that is, if the data is divisible, there is no error. If the remainder is not 0, that is, if the data is indivisible, there is an error. Each blank datum is a train of recorded data, and was formed in 4 bits (1111) so that its length was equal to the length of each CRC code. For each even track number, the CRC code precedes the blank datum. For each odd track number, the blank datum precedes the CRC code.

Figure 15:
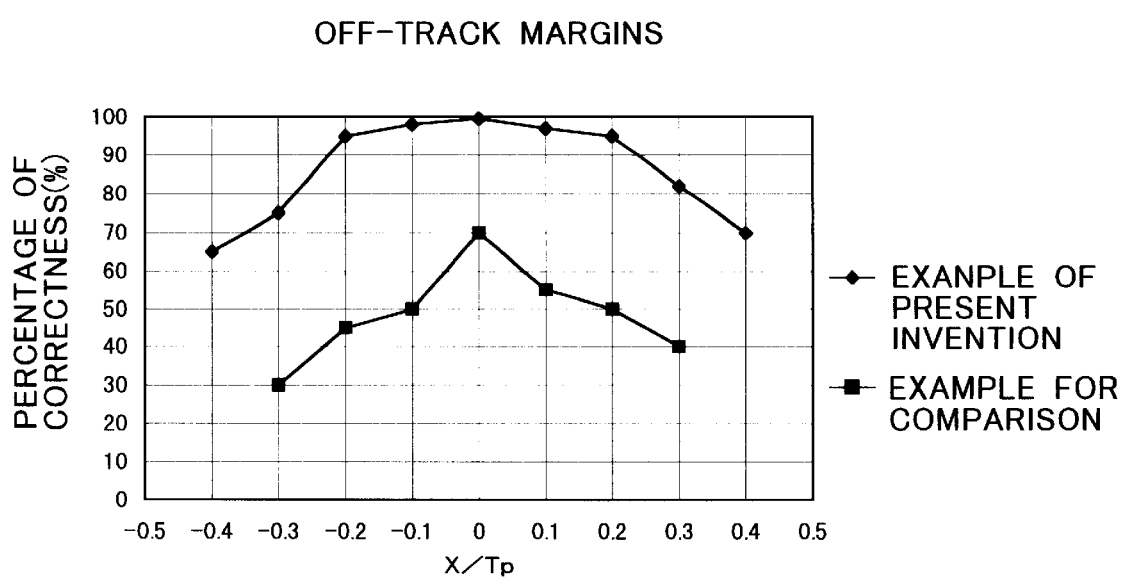
FIG. 15 is a graph showing the percentages of correct decoding with respect to the displacement from the central middle positions in the tracks of the magneto-optical disk made in Embodiment 2.

Next, similarly to the embodiment 1, with the magneto-optical disk set in the recorder/reproducer shown in FIGS. 10 and 11, signals reproduced from pre-pits of the disk were detected, and it was found out whether address data and sector data had been decoded correctly or exactly (percentages of correct decoding). The results are shown in the graph of FIG. 15. The percentages of correct decoding were found out with the associated CRC codes. For comparison, the graph of FIG. 15 shows percentages of correct decoding on a magneto-optical disk having pre-pit data without blank data (see FIG. 14). In the graph of FIG. 15, the horizontal axis represents the ratios of the displacement from the central positions in tracks of the disk in the directions across the tracks to the track pitch (Tp).

As obvious from the graph of FIG. 15, the percentages of correct decoding on the magneto-optical disk of the invention are improved. This proves the address information and the CRC codes to have been correctly read out. It is also found out that high percentages of correct coding are obtained even if the information and the codes are read out at positions displaced from the central positions in the tracks in the directions across the tracks, and that the track offset margins are wider.

Embodiment 3

Percentages of correct decoding of address data and sector data on the magneto-optical disks made in accordance with the embodiments 1 and 2 were found by means of a recorder/reproducer substantially identical in structure with that shown in FIG. 10. The recorder/reproducer of this embodiment 3 differed from that of the foregoing embodiments only in that it included a floating type head fitted with a pair of objective lenses having NAs of 0.8 and 0.95, instead of the combination of the objective lens 71 and the solid immersion lens 200, and that the head was floated or suspended at a height of about 1 micron from the disk. It was confirmed that the percentages of correct decoding on the magneto-optical disks of the embodiments 1 and 2 were improved with this recorder/reproducer as well.

Embodiment 4

Another magneto-optical recording medium was made as an information recording medium according to the invention. This recording medium had pre-format information as magnetic marks, which included address data, error detecting codes, etc. With this recording medium set in a recorder/reproducer including a floating type head fitted with a magneto-resistive element, it was found out whether address data and sector data had been correctly decoded (percentages of correct decoding).

Figure 16:
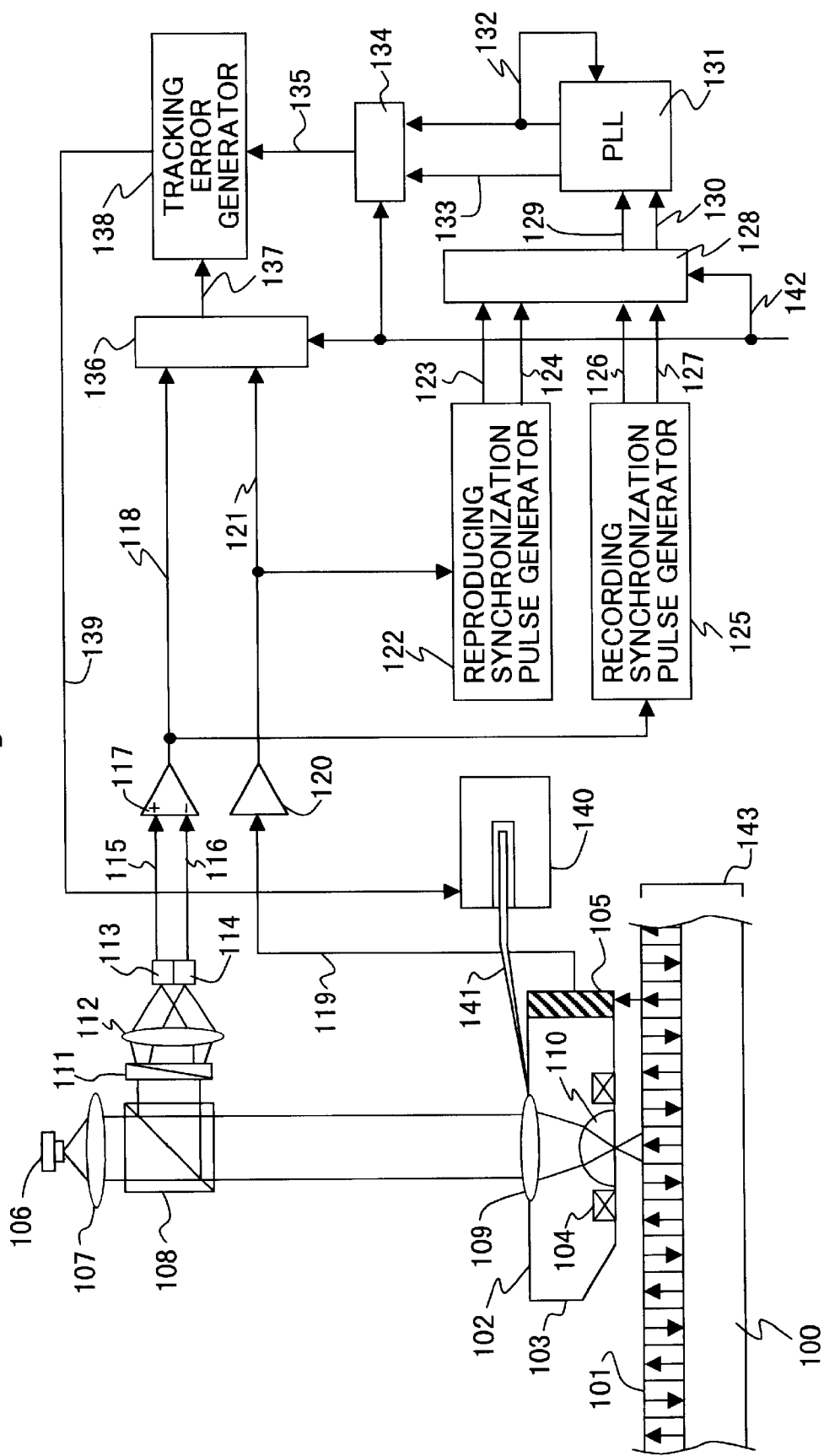
FIG. 16 is a schematic diagram of a recorder/reproducer according to Embodiment 4.

First, a recorder/reproducer including a floating type head fitted with a magneto-resistive element will be described below. FIG. 16 is a schematic diagram of this recorder/reproducer.

[Recording/Reproducing Head]

With reference to FIG. 16, a recording/reproducing head 102 includes an optical system, which includes a focusing lens 109 for use during recordation and a solid immersion lens (SIL) 110, a coil 104 for applying a magnetic field during recordation, and a magnetic head 105 for reproduction. These parts are mounted on or in a slider 103, which is fitted to the front end of a swing arm 141. A magneto-optical recording medium 143 takes the form of a disk and can be rotated by a motor, which is not shown. Details of the recording medium 143 will be described later. When the recording medium 143 rotates, air flows into the space between the medium and the slider 103. The air flow floats or suspends the slider 103 over the recording medium 143. By balancing the floating force and the urging force of the swing arm 141 (the force with which the arm urges the slider 103 toward or against the medium 143) with each other, it is possible to float the slider 103 at a constant height from the recording medium 143. The recorder/reproducer was so set that the constant height was about 30 nm. A semiconductor laser 106 was used as a laser illuminant, and the wavelength λ=660 nm.

[Magneto-Optical Recording Medium and Recordation of Management Information]

Figure 21:
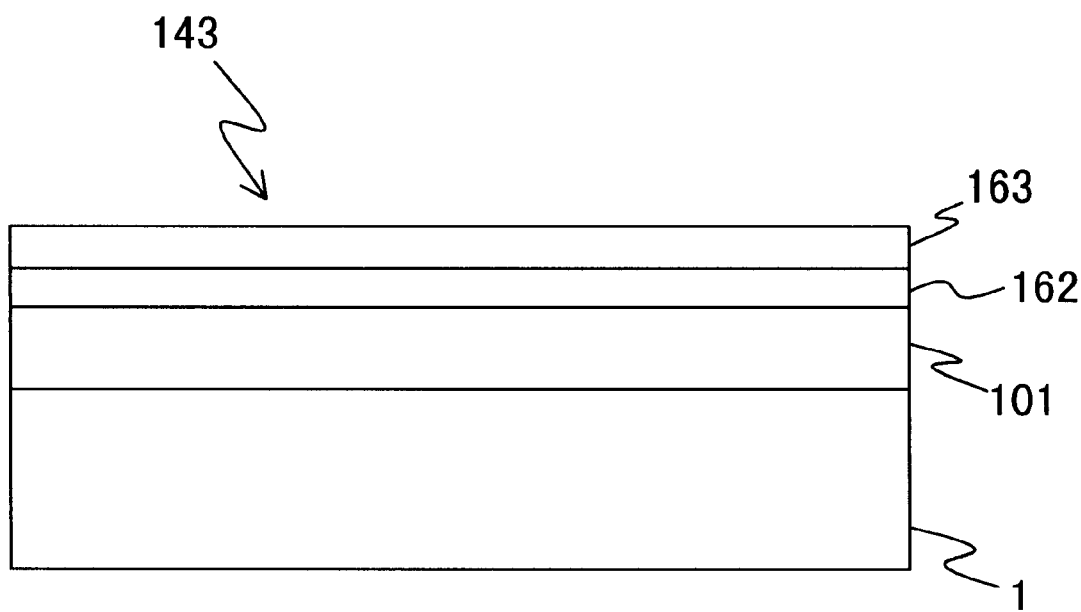
FIG. 21 is a schematic section of the information recording medium made in Embodiment 4.

As shown in FIG. 21, the magneto-optical recording medium 143 includes a recording layer 101, a protective layer 162 and a lubricant layer 163 which are laminated or stacked in order on a flat substrate 1. Information can be recorded as directions of magnetization on the recording layer 101. Similarly to the recording layers of conventional magneto-optical recording media, the recording layer 101 may be made of TbFeCo or other vertically magnetized magnetic material. The protective layer 162 protects the recording layer 101 from wear or abrasion and/or corrosion or erosion, and may be made of SiN. The lubricant layer 163 ensures or secures running durability of the head on the recording medium 143, and may be made of perfluoropolyether. The recording layer 101 may be either an inplane magnetization layer or a vertical magnetization layer.

Figure 20:
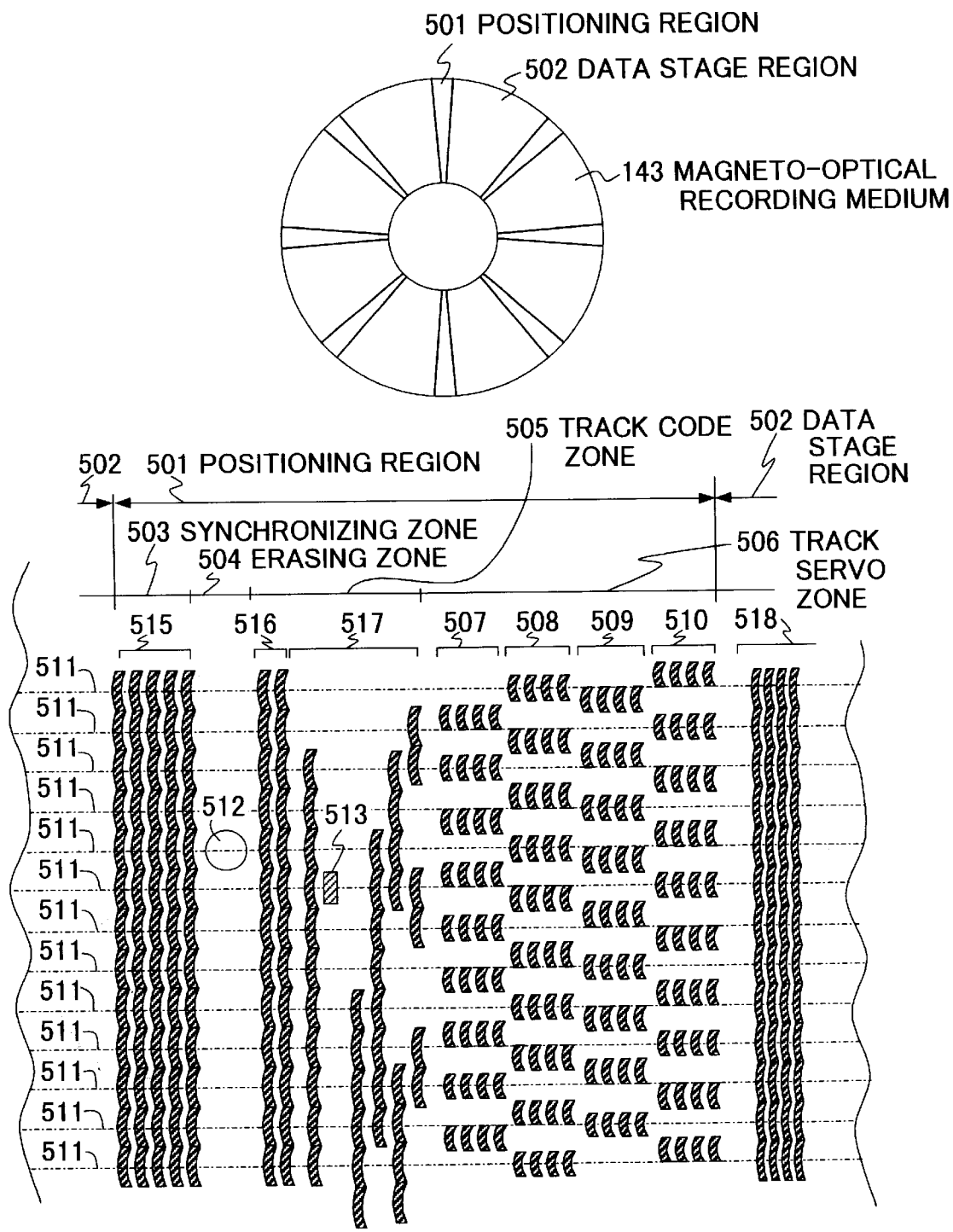
FIG. 20 is a plan view of the information recording medium made in Embodiment 4 and a diagram of magnetic mark patterns formed in a positioning region.

FIG. 20 is a schematic plan of the magneto-optical recording medium 143 as viewed on the side where the recording layer lies. The recording medium 143 is formed with positioning regions 501 and data storage regions 502. Before recordation or reproduction, information for management of the storage regions 502 and information for control of the position of a light spot 512 and/or the position of a magnetic head 513 are recorded in the positioning regions 501. Specifically, each positioning region 501 includes a synchronizing zone 503, a track code zone 505 and a track servo zone 506. Before information is recorded or reproduced, synchronization patterns 515 are recorded in the synchronizing zone 503, and track code starting patterns 516 and track codes 517 are recorded in the code zone 505, while servo patterns 507–510 are written in the servo zone 506. The track codes 517 include data trains of track numbers, track data, sector data and error detecting codes, as shown in FIG. 4. The error detecting codes are generated similarly to the embodiment 1. FIG. 4 shows data trains recorded as part of the track codes in the tracks represented by decimal track numbers 10000–10020. The above patterns were recorded by the light pulse magnetic field modulation method used with conventional optical disk apparatus, with the head position controlled precisely by a servo writer used conventionally with magnetic disk apparatus. A lower portion of FIG. 20 is a general view of one of the positioning regions 501 where information has been written.

In order that the patterns written in the synchronizing zones 503 and the track code zones 505 can be detected with the light spot 512 and/or the magnetic head 513 in any positions, the width (in the directions perpendicular to those in which the code tracks 511 extend) of each of these patterns is so adjusted as to nearly equal each of the track intervals. The width of each of the servo patterns 507–510 written in the track servo zones 506 is so adjusted as to be smaller than each of the track intervals, because the width (in the directions perpendicular to those in which the code tracks 511 extend) of the magneto-resistance effect element of the magnetic head 513 being used is smaller than each of the intervals between the code tracks 511. If each of the servo patterns 507–510 is nearly equal in width to, or narrower than, the magnetic head 513, there can be no dead zone when the magnetic head 513 generates a track error signal. The relation(ship) between the width of each of the servo patterns 507–510 and the width of the magnetic head 513 is similar to that of the conventional magnetic disk apparatus. Because the magnetic head 513 was 0.4 micron in width, the width of each of the servo patterns 507–510, too, was so adjusted as to be roughly 0.4 micron. However, the laser power was so set as to be smaller when the servo patterns 507–510 were recorded than when the other patterns were recorded in the positioning regions 501, and the laser power was so controlled that each of the servo patterns 507–510 was nearly equal in width to the magnetic head 513.

[Optical Head Positioner]

A description will be given below of a device (first positioner or positioning device) for making the optical spot 512 follow the code tracks 511 in accordance with the patterns recorded in the positioning regions 501 by the foregoing means.

The conventional optical disk apparatus for recordation on, and reproduction from, a magneto-optical recording medium reproduces information by utilizing the phenomenon that the plane of polarization of the light beam reflected by a recorded magnetic mark rotates by θk relative to the plane of polarization of the associated incident beam, and the phenomenon that the plane of polarization of the light beam reflected by a thing other than a recorded magnetic mark rotates by −θk relative to the plane of polarization of the associated incident beam. The angle of rotation θk is referred to as the Kerr angle of rotation, which is a magneto-optical effect. In a conventional manner, as shown in FIG. 16, an optical system for detecting the rotation of a plane of polarization consists of a Wollaston prism 111, a condensing or collective lens 112, and photodetectors 113 and 114. The detectors 113 and 114 make photoelectric conversions to output magneto-optical signals 115 and 116, respectively. A (finite) difference unit 117 generates a magneto-optical signal 118 which is the finite difference between the signals 115 and 116. Because the amplitude of the magneto-optical signal 118 varies with the angle of rotation θk or −θk, the conventional optical disk apparatus reproduces recorded information by using this magneto-optical signal 118.

The recorder/reproducer of this embodiment generates a tracking error signal from a magneto-optical signal 118 used conventionally for information reproduction. As shown in FIG. 20, the light spot 512 follows a code track 511 on the basis of the tracking error signal. In order to precisely generate tracking error signals of the head, it is necessary to accurately detect the patterns recorded in the positioning regions 501 shown in FIG. 20. The magneto-optical recording medium 143 is rotated at a substantially constant speed by the motor (not shown), but the speed fluctuates slightly with time because the motor has wow and flutter. Therefore, in order to accurately detect the patterns recorded in the positioning regions 501, it is necessary to generate synchronization signals 133 synchronous with the rotation of the recording medium 143, and detect the patterns on the basis of the synchronization signals 133. The generation of the synchronization signals 133 involves detecting the edge positions of the patterns recorded in the positioning regions 501, then generating target signals synchronous with the rotation of the recording medium 143, and synchronizing the synchronization signals 133 with the target signals.

Figure 18:
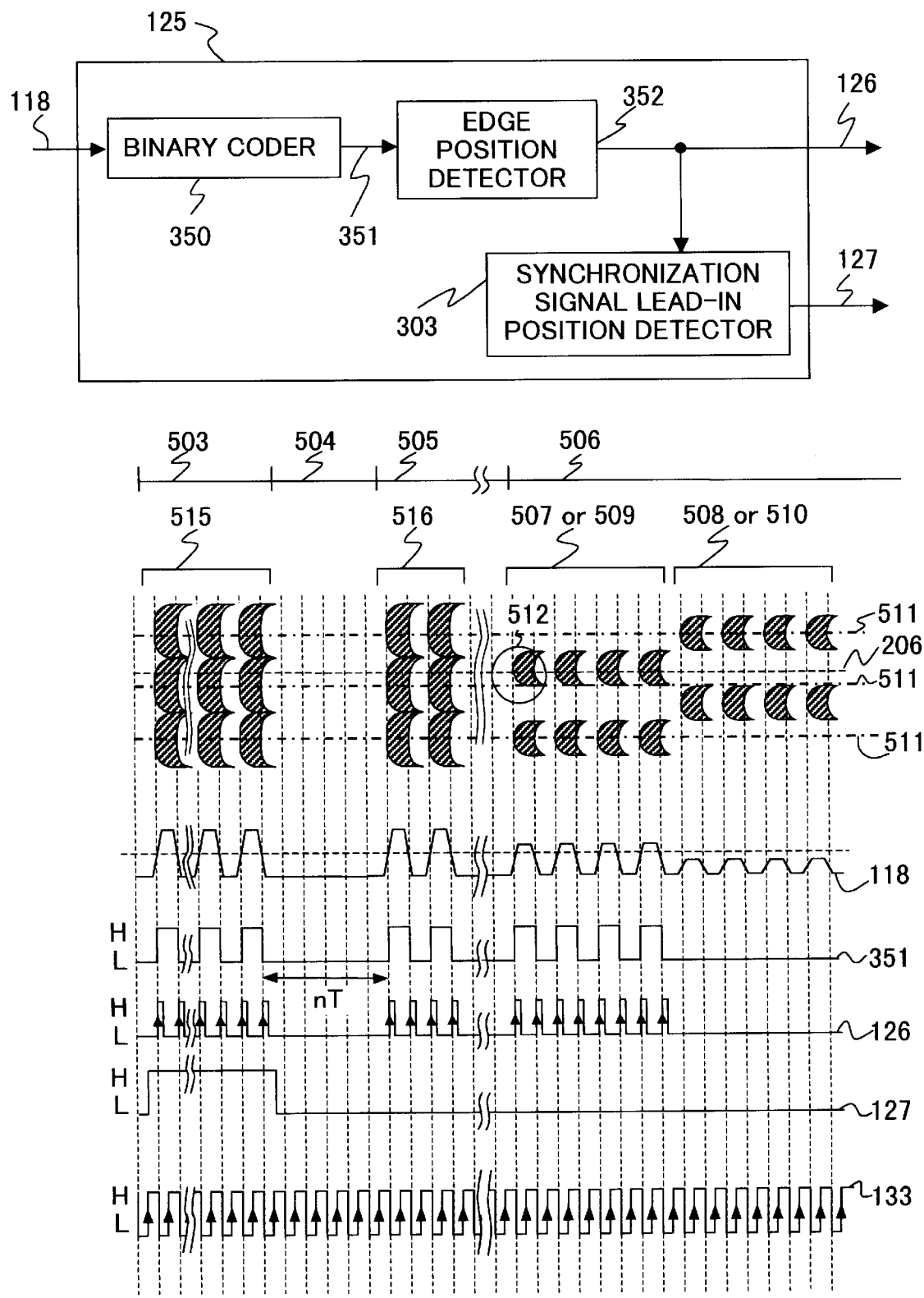
FIG. 18 is a diagram of a recording synchronization pulse generator, a mimetic diagram of groups of management information marks formed in an information recording medium, and a diagram of the signals reproduced from the mark groups with an optical head.

With reference to FIG. 16, the recorder/reproducer includes a recording synchronization pulse generator 125 for generating such target signals. As shown in detail in FIG. 18, the pulse generator 125 consists of a binary coder 350, an edge position detector 352 and a synchronization signal lead-in position detector 303. The mimetic diagram of information marks in FIG. 18 shows part of the synchronization patterns 515, the track code starting patterns 516 and the servo patters 507–510 shown in FIG. 20. The signal waveforms shown in a lower area of FIG. 18 are a timing chart of the signals generated in and by the pulse generator 125 while the optical spot 512 is moving on (along) a tracking locus 208. First, the magneto-optical signal 118, which varies in amplitude with the angle of rotation θk or −θk of a plane of polarization, is converted into a binary coded signal 351 by the binary coder 350 at the slice level indicated by a broken line. On the basis of the binary coded signal 351, the edge position detector 352 outputs recording synchronization pulses 126. The leading edges of the synchronization pulses 126 coincide substantially with the leading or trailing edge positions of the binary coded signal 351. On the basis of the synchronization pulses 126, a synchronization signal 133 is generated. The widths of the synchronization patterns 515 and the track code starting patterns 516 are nearly equal to the track intervals. Therefore, whether the tracking locus 206 of the light spot 512 coincides with a code track 511 or not, the leading edges of the synchronization pulses 126 appear at the edges of the synchronization patterns 515 and the starting patterns 516. The synchronization signal lead-in position detector 303 always observes the intervals where no pulse exists in the trains of recording synchronization pulses 126. If any of these pulse intervals is roughly nT, the lead-in position detector 303 judges or decides that the light spot 512 has passed through an erasing zone 504. Then, this position detector 303 outputs a recording synchronization lead-in gate signal 127 which is high in level only while the light spot 512 is positioned in the next synchronizing zone 503 when the recording medium 143 has turned further. The recording format of the recording medium 143 has been preset, however, in such a manner that each of the pulse intervals which is roughly nT appears only between the trains of synchronization patterns 515 and the trains of track code starting patterns 516 in one of the positioning regions 501.

With reference to FIG. 16, during information recordation, a host controller (not shown) outputs recording/reproducing gate signals 142 at a high level. In the meantime, a multiplexer 128 outputs recording synchronization pulses 126 as synchronization pulses 129, and outputs recording synchronization lead-in gate signals 127 as synchronization lead-in gate signals 130.

A conventional synchronization signal generator (PLL circuit) 131 was used as a means for generating synchronization signals 133. Only while the synchronization lead-in gate signals 130 are high in level, that is to say, only while the light spot 512 is positioned in the synchronizing zones 503 in FIG. 18, the PLL circuit 131 applies feedback so that the leading edges of the synchronization signals 132 coincide with those of the synchronization pulses 129. This synchronizes the synchronization signals 132 with the rotation of the magneto-optical recording medium 143. The synchronization signals 133 output from the PLL circuit 131 are generated by reversal in level (high or low) of the synchronization signals 132. The synchronization signals 133, too, are synchronous with the rotation of the recording medium 143. As shown in FIG. 18, the leading edges of the thus generated synchronization signals 133 coincide substantially with the peak positions of the magneto-optical signals 118.

With reference to FIG. 16, when the recording/reproducing gate signals 142 are high in level, that is to say, during information recordation, a multiplexer 134 outputs synchronization signals 133 as sample clocks 135. When the gate signals 142 are high in level, a multiplexer 136 outputs magneto-optical signals 118 as reproduced signals 137.

A tracking error generator 138 generates tracking error signals 139 on the basis of the reproduced signals 137 and the sample clocks 135, that is to say, on the basis of the magneto-optical signals 118 and the synchronization signals 133. This generator 138 may be similar to a conventional tracking error signal generating circuit. The principle of generation of the tracking error signals will be explained briefly below.

As shown in FIG. 18, the leading edges of the synchronization signals 133 coincide substantially with the peak positions of the magneto-optical signals 118. Accordingly, the tracking error generator 138 samples the reproduced signals 137 in order at the leading edges of the sample clocks 135, and calculates the values of peak amplitude of the reproduced signals of the servo patterns 507 and 508 or the servo patterns 509 and 510. Once the values of peak amplitude are found, a tracking error signal 139 is calculated as the finite difference in peak amplitude between servo patterns 507 and 508 or between servo patterns 509 and 510.

Figure 19:
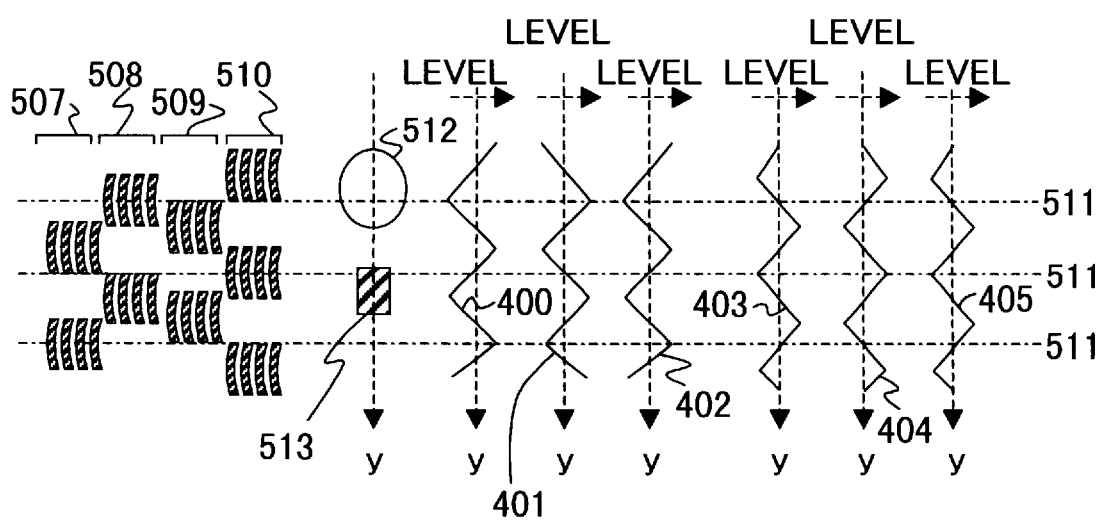
FIG. 19 is a diagram for description of the generation of a tracking error signal with an optical head and a magnetic head.

FIG. 19 is a mimetic diagram of thus found tracking error signals. When the light spot 512 moves perpendicularly (along the y-axis) to the code tracks 511, the values of peak amplitude of the reproduced signals 137 of servo patterns 507 vary as represented by a peak amplitude waveform 400. Likewise, the values of peak amplitude of the reproduced signals 137 of servo patterns 508, 509 and 510 vary as represented by peak amplitude waveforms 401, 403 and 404, respectively. At this time, the tracking error signal 139 is represented by a tracking error. waveform 402 (the level of which is scaled arbitrarily) as the finite difference between the amplitude waveforms 400 and 401, or by a tracking error waveform 405 (the level of which is scaled arbitrarily) as the finite difference between the amplitude waveforms 403 and 404. The tracking error generator 138 decides which of the error waveforms 402 and 405 will be adopted as the error signal 139. For example, on the basis of the results of detection of the track codes 517 in front of the track-servo zone 506, the error waveform 402 is adopted for every other code track including the second track (even number), while the error waveform 405 is adopted for every other code track including the first track (odd number).

With reference to FIG. 16, once a tracking error signal 139 is generated by the above means, an actuator 140 so controls the position of the recording/reproducing head 102, which is fitted to the front end of the swing arm 141, as to make the error signal 139 smaller in a conventional manner.

[Magnetic Head Positioner]

A description will be given below of a device (second positioner) for making the magnetic head 105 follow the code tracks 511 in accordance with the patterns recorded in the positioning regions 501. In order for the magnetic head 105 to follow the code tracks 511, this head 105 reproduces the patterns recorded in the positioning regions 501. On the basis of the magnetic reproduced signals 119 obtained as a result of the reproduction, the position of the magnetic head 105 is controlled. A preamp 120 amplifies the reproduced signals 119 to such a degree that they are nearly equal in amplitude to the magneto-optical signals 118. The preamp 120 outputs amplified magnetic reproduced signals 121. Similarly to the position control of the light spot 512, a reproducing synchronization pulse generator 122 generates target signals with which the synchronization signals 132 output from the PLL circuit 131 on the basis of the amplified magnetic reproduced signals 121 can be synchronous with the rotation of the magneto-optical recording medium. The signal waveforms obtained if the patterns recorded in the positioning regions 501 are reproduced with the light spot 512 differ from those obtained if these patterns are reproduced by the magnetic head 105. Therefore, in order to generate target signals corresponding to the edges of the patterns, individual or separate synchronization pulse generators are needed.

Figure 17:
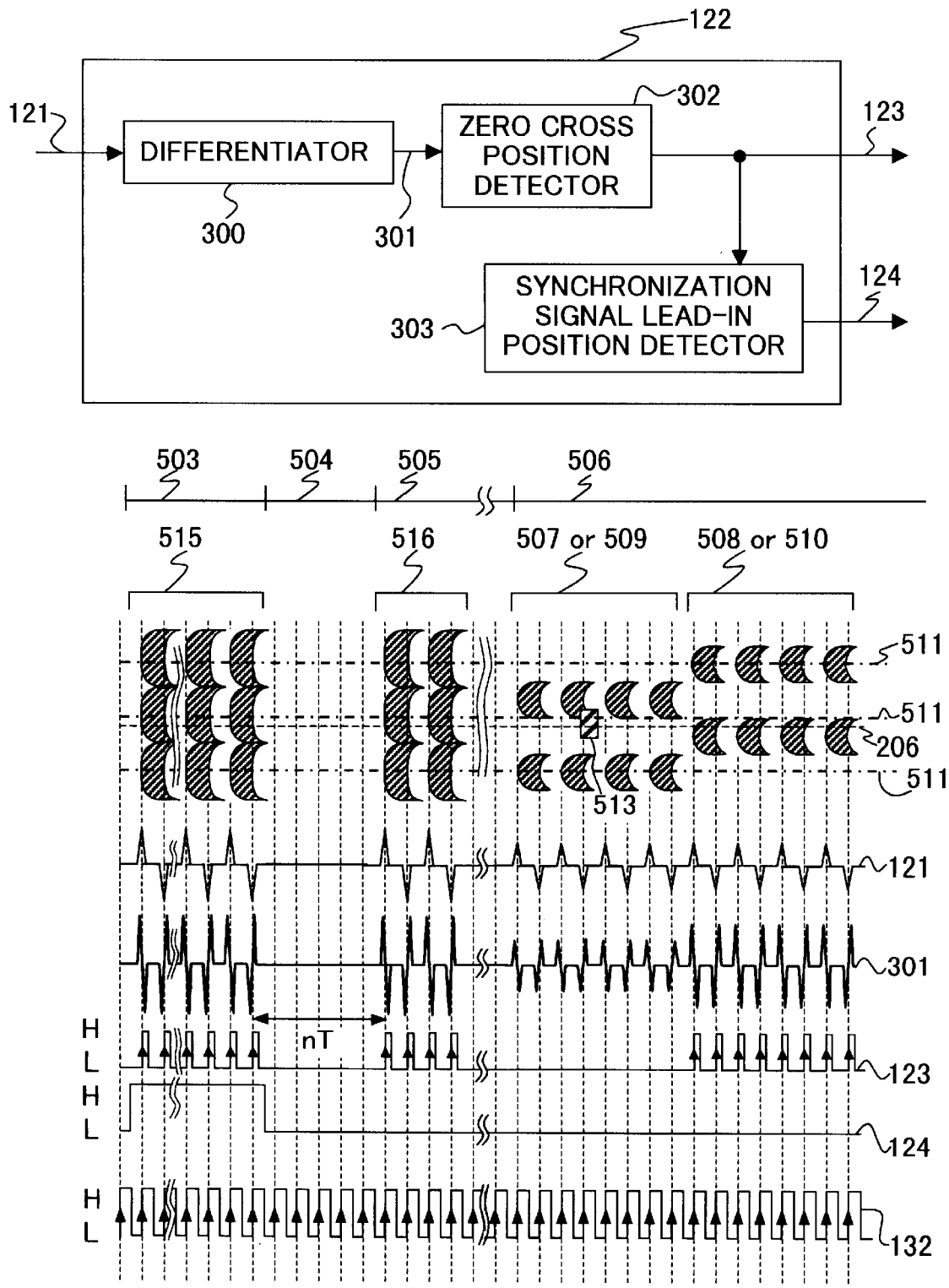
FIG. 17 is a diagram of a reproducing synchronization pulse generator, a mimetic diagram of groups of management information marks formed in an information recording medium, and a diagram of the signals reproduced from the mark groups with a magnetic head.

FIG. 17 is a detailed diagram of the reproducing synchronization pulse generator 122, which includes a differentiator 300, a zero cross position detector 302 and a synchronization signal lead-in position detector 303. The mimetic diagram of information marks in FIG. 17 shows part of the synchronization patterns 515, the track code starting patterns 516 and the servo patters 507–510 shown in FIG. 20. The signal waveforms shown under the mimetic diagram are a timing chart of the signals generated in and by the pulse generator 122 while the magnetic head 513 is moving along a tracking locus 206. As shown in FIG. 17, the amplified magnetic reproduced signals 121 have waveforms pulsed at the edges of the patterns. Therefore, the differentiator 300 differentiates the reproduced signals 121 and generates differentiated signals 301 which cross the zero level at the pattern edges. The zero cross position detector 302 extracts the zero positions of the differentiated signals 301 and generates reproducing synchronization pulses 123, the leading edges of which coincide substantially with the zero cross positions of the differentiated signals 301. Whether the tracking locus 208 of the magnetic head 513 coincides with a code track 511 or not, the leading edges of the synchronization pulses 123 appear at the edges of the synchronization patterns 515 and the track code starting patterns 516. The synchronization signal lead-in position detector 303 is entirely identical with that of the recording synchronization pulse generator 125, and likewise outputs reproducing synchronization lead-in gate signals 124 which are high in level only while the magnetic head 513 is positioned in the synchronizing zones 503.

During information reproduction, the host controller (not shown) outputs recording/reproducing gate signals 142 at a low level in FIG. 16. In the meantime, the multiplexer 128 outputs reproducing synchronization pulses 123 as synchronization pulses 129, and outputs reproducing synchronization lead-in gate signals 124 as synchronization lead-in gate signals 130.

As shown earlier, only while the synchronization lead-in gate signals 130 are high in level, that is to say, only while the magnetic head 513 is positioned in the synchronizing zones 503, the PLL circuit 131 applies feedback so that the leading edges of the synchronization signals 132 coincide with those of the synchronization pulses 129. This synchronizes the synchronization signals 132 with the rotation of the magneto-optical recording medium 143.

When the recording/reproducing gate signals 142 are low in level, that is to say, during information reproduction, the multiplexer 134 outputs synchronization signals 132 as sample clocks 135. When the gate signals 142 are low in level, the multiplexer 136 outputs amplified magnetic reproduced signals 121 as reproduced signals 137.

The tracking error generator 138 operates entirely in the same manner as during recordation. As shown in FIG. 19, even when the magnetic head 513 moves perpendicularly (along the y-axis) to the code tracks 511, the tracking error signals 139 are nearly equal to the tracking error waveform/s 402 and/or 405 obtained when the light spot 512 moves along the y-axis.

Once a tracking error signal 139 is-generated by the above means, the actuator 140 so controls the position of the recording/reproducing head 102, which is fitted to the front end of the swing arm 141, as to make the error signal 139 smaller in a conventional manner. This positions the magnetic head 513.

Next, percentages of correct decoding were found with the magnetic head 513 detecting reproduced signals from track codes which include address data, error detecting codes, etc. It was possible to confirm that even a recording medium like that of this embodiment, where format information including track codes had been recorded in the form of magnetic marks, had higher percentages of correct decoding.

The first control signal generator consists mainly of the recording synchronization pulse generator, the multiplexers, the PLL circuit and the tracking error generator of the foregoing apparatus. The second control signal generator consists mainly of the reproducing synchronization pulse generator, the multiplexers, the PLL circuit and the tracking error generator.

The information recording media and the recording/reproducing apparatus of the invention have been described hereinbefore, but the invention is not limited to them. For example, the information recording media of the embodiments are information recording media each including a magnetic layer which is a vertical magnetization film, but the invention can also be applied to information recording media each including a magnetic layer which is an inplane magnetization film.

The information recording media of the invention are not limited to magneto-optical disks, but it can be applied to phase change type optical recording media, additional recording type optical recording media having organic pigment in their recording layers, optical recording media only for reproduction, optical recording media for recordation in lands and grooves, and any other optical recording media. The invention may also be applied to magnetic disks for magnetic recordation and reproduction.

Other error detecting codes than those of the embodiment 1 may be generated. The bits of these detecting codes are as follows:

$E_1 = P(S_1 T_1 T_8 T_9 T_{16})$ $E_2 = P(S_2 T_2 T_7 T_{10} T_{15})$ $E_3 = P(S_3 T_3 T_6 T_{11} T_{14})$ $E_4 = P(S_4 T_4 T_5 T_{12} T_{13})$.

As the blank data of the embodiment 2, trains of recording data "1111" are formed. Alternatively, the blank data of the invention may be regions without recording data such as "0000". The pre-pit data of this embodiment may include the side numbers indicating the sides of a disk, in addition to the sector marks, the VFOs, the address data, the CRC codes and the blank data.

The information recording medium according to the first aspect of the invention has error detecting codes for detection of the errors of address data. The detecting codes are so constructed or formed that the distance between the detecting codes of adjacent tracks is always 1. This minimizes the number of places where cross talk may occur. Consequently, even if the track intervals of the recording medium are narrow for large capacity, it is possible to reliably read out the pre-format information such as the address information and the error detecting codes, which are formed as pre-pits, without substantial influence of cross talk.

The information recording medium according to the second aspect of the invention has a blank datum just before each CRC code of one of any adjacent tracks and a blank datum just behind each CRC code of the other track so that the codes of the adjacent tracks are offset from each other. This reduces the cross talk of the signals reproduced from pre-pits in adjacent tracks. Consequently, even if the track intervals of the recording medium are narrow for large capacity, it is possible to reliably read out the pre-format information such as the address information and the CRC codes, which are formed as pre-pits.

The information recording media according to the first and second aspects of the invention are very suitable as optical recording media with narrower track pitch, and particularly as optical recording media of such a type that information can be recorded and reproduced while a head slider fitted with a solid immersion lens is floated or suspended over a disk.

The error detecting method of the invention makes it possible to generate such error detecting codes that the distance between the detecting codes of adjacent tracks is always 1. This can minimize the occurrence of cross talk, making it possible to reliably detect the error of address information.

What is claimed is:

1. An information recording medium having a plurality of tracks each sectioned into sectors, wherein each of the sectors has a mark representing address data which represents an address of the associated sector and a mark representing an error detecting code for detection of the error of the address data; and the error detecting codes of the tracks are so formed that a distance between the detecting codes of adjacent tracks is always 1.

2. The information recording medium according to claim 1, wherein the address data includes a sector number and a Gray coded track number; and the error detecting code consists of parity check bits generated on the basis of the sector number and the track number.

3. The information recording medium according to claim 1, wherein each of the parity check bits is generated from a group of data generated with a plurality of bits selected from the bit train of the Gray coded track number and the bit train of the sector number.

4. The information recording medium according to claim 1, wherein the marks are selected from a group consisting of:

pits formed in a substrate of the recording medium;

magnetic marks formed on the basis of the directions of magnetization on a magnetic film of the recording medium;

marks formed on the basis of a difference in crystal structure between crystalline and amorphous substances of a phase change material of the recording medium; and marks formed by a chemical change of the organic dye film of the recording medium.

5. The information recording medium according to claim 1, wherein information is recorded on and reproduced from the medium with a floating type head provided with a solid immersion lens.

6. The information recording medium according to claim 1, wherein information is recorded on and reproduced from the medium with a floating type head provided with an objective lens having an NA between 0.8 and 0.95.

7. The information recording medium according to claim 1, wherein information can be recorded with light and an external magnetic field applied; and information is reproduced with a floating type head provided with a magneto-resistance effect element.

8. An information recording medium having a plurality of tracks each sectioned into sectors, wherein each of the sectors has marks representing pre-format signals;

the marks representing preformat signals include a sector mark representing the front of the associated sector, a VFO for timing control in reading data, an address mark representing the position from which address data starts to be read out, address data representing the address of the sector, and a CRC code for detection of the error of the address data; and one of adjacent tracks has blank data just before each of the CRC codes thereof, while the other track has blank data just after each of the CRC codes thereof, so that the CRC codes of the adjacent tracks do not adjoin.

9. The information recording medium according to claim 8, wherein the blank data and the CRC codes are substantially equal in length.

10. The information recording medium according to claim 8, wherein the address data of each of the tracks include a track number representing the position of the associated track; and the track number is converted into a Gray code to be recorded on the recording medium.

11. The information recording medium according to claim 8, wherein the sector marks, the VFOs, the address marks and the address data of each of the tracks adjoin the sector marks, the VFOs, the address marks and the address data, respectively, of the adjacent track thereof.

12. The information recording medium according to claim 8, wherein the marks are selected from a group consisting of:

pits formed in a substrate of the recording medium;

magnetic marks formed on the basis of a direction of magnetization in a magnetic film of the recording medium;

marks formed on the basis of a difference in crystal structure between crystalline and amorphous substances of a phase-changing material of the recording medium; and marks formed by a chemical change of an organic dye film of the recording medium.

13. The information recording medium according to claim 8, wherein information is recorded on and reproduced from the medium with a floating type head provided with a solid immersion lens.

14. The information recording medium according to claim 8, wherein information is recorded on and reproduced from the medium with a floating type head provided with an objective lens having an NA between 0.8 and 0.95.

15. The information recording medium according to claim 8, wherein information is recorded with light and an external magnetic field applied; and information is reproduced with a floating type head provided with a magneto-resistance effect element.

16. An error detecting method for detecting the error of address information including a track number which represents the position of a track and a sector number which represents the position of a sector, comprising the steps of:

converting the track number into a Gray code;

dividing the Gray coded track number and the sector number to obtain a plurality of data groups;

generating such parity check bits each from one of data groups that a distance between the codes of adjacent tracks is 1; and detecting the error of the address information by using the check bits.

* * * * *